United States Patent [19]
Musetti

[11] Patent Number: 4,748,937
[45] Date of Patent: Jun. 7, 1988

[54] RETRACTABLE LEASH

[76] Inventor: Louis J. Musetti, 3455 7th Ave., Carmel, Calif. 93923

[21] Appl. No.: 887,538

[22] Filed: Jul. 21, 1986

Related U.S. Application Data

[63] Continuation-in-part of Ser. No. 750,501, Jul. 1, 1985, abandoned.

[51] Int. Cl.$^4$ .............................................. A01K 27/00
[52] U.S. Cl. ................................. 119/109; 242/107.3; 242/107.6; 242/98
[58] Field of Search ............ 242/107, 107.3, 107.4 R, 242/107.5, 107.6; 119/109

[56] References Cited

U.S. PATENT DOCUMENTS

| | | | |
|---|---|---|---|
| 2,217,323 | 10/1940 | Sackett | 242/98 |
| 2,250,171 | 7/1941 | Wilkins | 242/98 |
| 3,315,642 | 4/1967 | Rogers et al. | 242/107.4 X |
| 4,202,510 | 5/1980 | Stanish | 242/107.6 X |
| 4,300,732 | 11/1981 | Gaeta | 242/107.3 |
| 4,328,767 | 5/1982 | Petersen | 119/109 |

Primary Examiner—David A. Scherbel
Assistant Examiner—Creighton Smith
Attorney, Agent, or Firm—Sanford Astor

[57] ABSTRACT

This invention relates to a leash which coils up automatically when the handle is released. The invention comprises a generally cylindrical center portion with handles on either side, which is manufactured in two parts and can be assembled easily. The two parts are then sonically sealed to provide a strong and secure body. A retractable spring is fixedly attached inside in such a manner that it easily pulls out and retracts without catching or snagging.

21 Claims, 2 Drawing Sheets

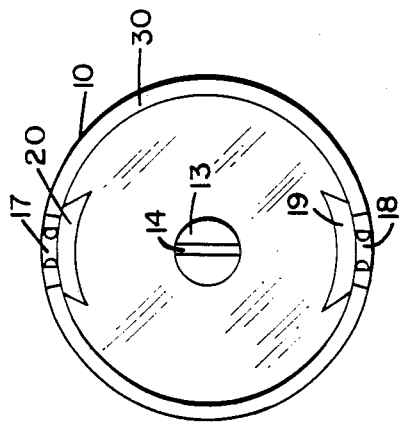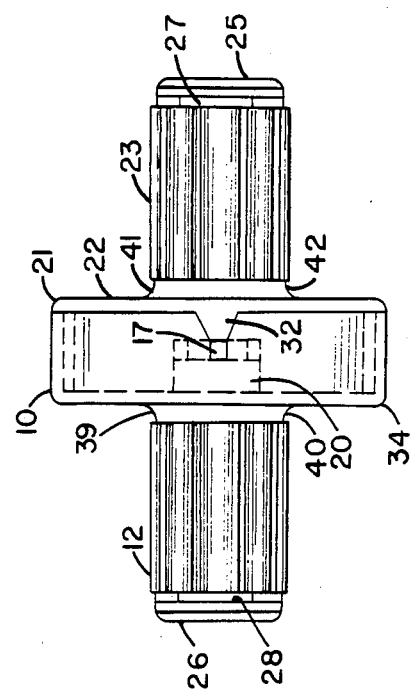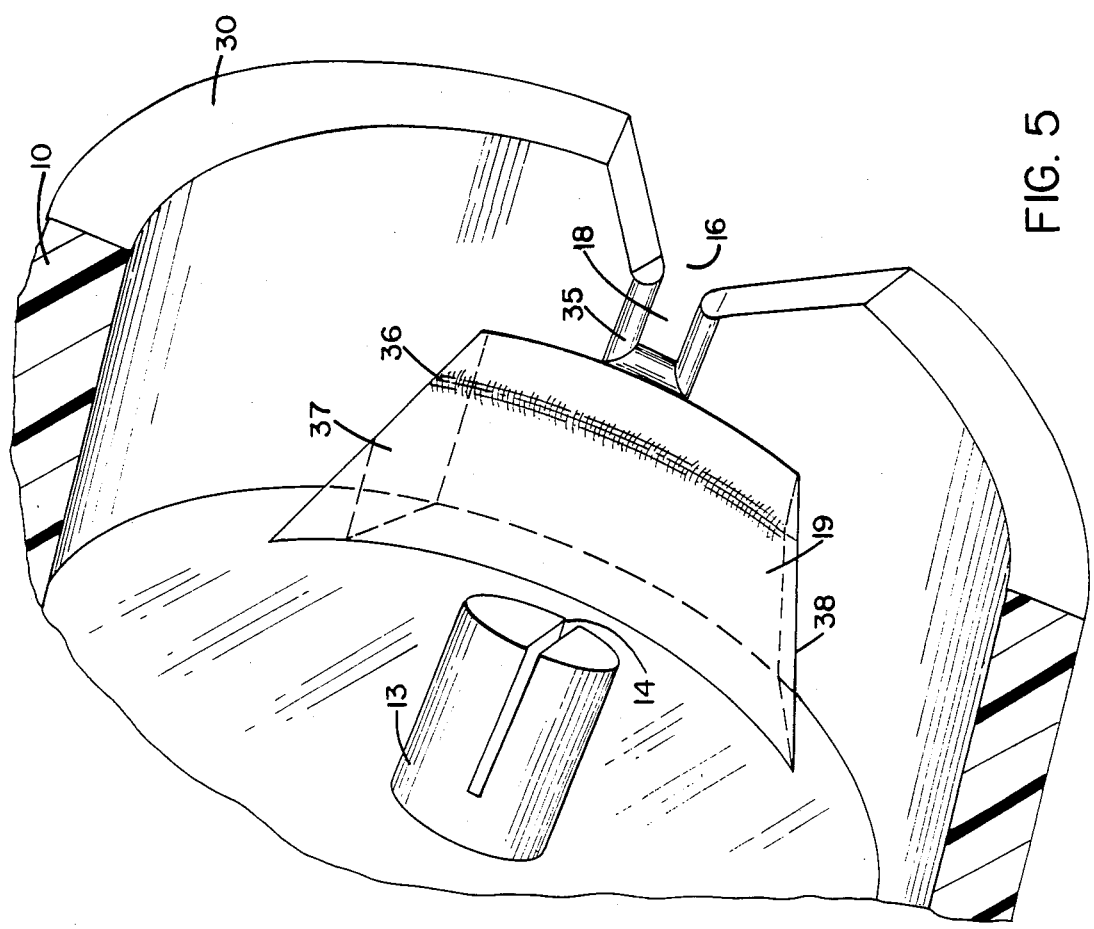

RETRACTABLE LEASH

This application is a continuation-in-part of my copending application Ser. No. 750,501 filed July 1, 1985, now abandoned.

BACKGROUND OF THE INVENTION

This invention relates generally to leashes and most specifically to retractable animal leashes, although the invention has application to use on things such as skateboards and surfboards and like devices.

With reference to animals and pets, most pet owners are either required to keep their pets on a leash or desire to do so to keep their pet under control. Normally, available leashes are in the form of some type of length of chain, strap or cord. Each time the owner wishes to take the animal out on the leash, he must find a leash and attach it to the pet's collar.

If the pet owner desires to release the animal at some location, he must unclip the leash from the animal's collar and allow the animal to roam free. At the time that he wishes to leash the animal again, he must reclip the leash to the collar. In some cases, in order to avoid unclipping the leash, the owner will allow the animal to roam free with the leash attached. This can cause damage to the leash, as well as to the animal.

With reference to skateboards and surfboards, either for training purposes or for specific tricks that are done by skateboard and surfboard riders, it is desirable to have a leash attached to the front tip of the board. If the user decided to release the leash, it would either drag on the ground or in the water. In the case of a skateboard, this would be dangerous since the lease could get caught in the wheels and in the case of a surfboard, it would be undesirable.

OBJECTS OF THE INVENTION

It is the object of the present invention to provide a retractable-extendable leash, which at all times can be fixedly attached to the collar of an animal or to the front of a skateboard or surfboard.

It is a further object of the invention to provide an extendable-retractable leash which is rugged, light weight, easily constructed and small enough to remain at all times on an animal's collar or on a surfboard or skateboard without, in any way, being in the way of the handler or the rider.

These and other objects of the invention are achieved by providing a leash having a high strength cable with means at one end for attachment to an animal collar or to a surfboard or skateboard and a handle assembly at the other end. Built into the handle assembly is a coil spring which tends to roll up the leash cable inside the central portion of the handle assembly. The handle is manufactured in two parts so that the spring can be inserted and the two parts fixedly attached together around the spring in the simplest of manners. In addition, the two portions of the handle are designed in such a way that the retractable cable will slide in and out easily without catching or snagging.

BRIEF DESCRIPTION OF THE DRAWINGS

FIG. 4 is a front view of the device showing the two portions of the handle clipped together.

FIG. 5 is an exploded view of the internal construction of one part of the handle, and FIG. 6 is an end view of one part of the two-part handle.

DETAILED DESCRIPTION OF THE DRAWINGS

Figure 1:
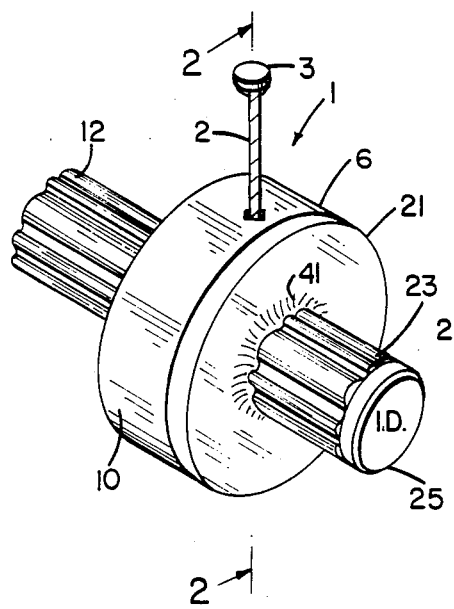
FIG. 1 is a perspective view of the retractable leash shown in accordance with the present invention.
Figure 2:
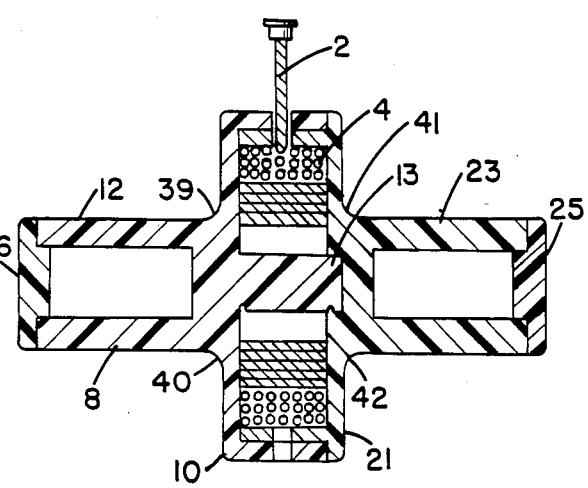
FIG. 2 is a cross sectional view taken along lines 2—2 of FIG. 1
Figure 3:
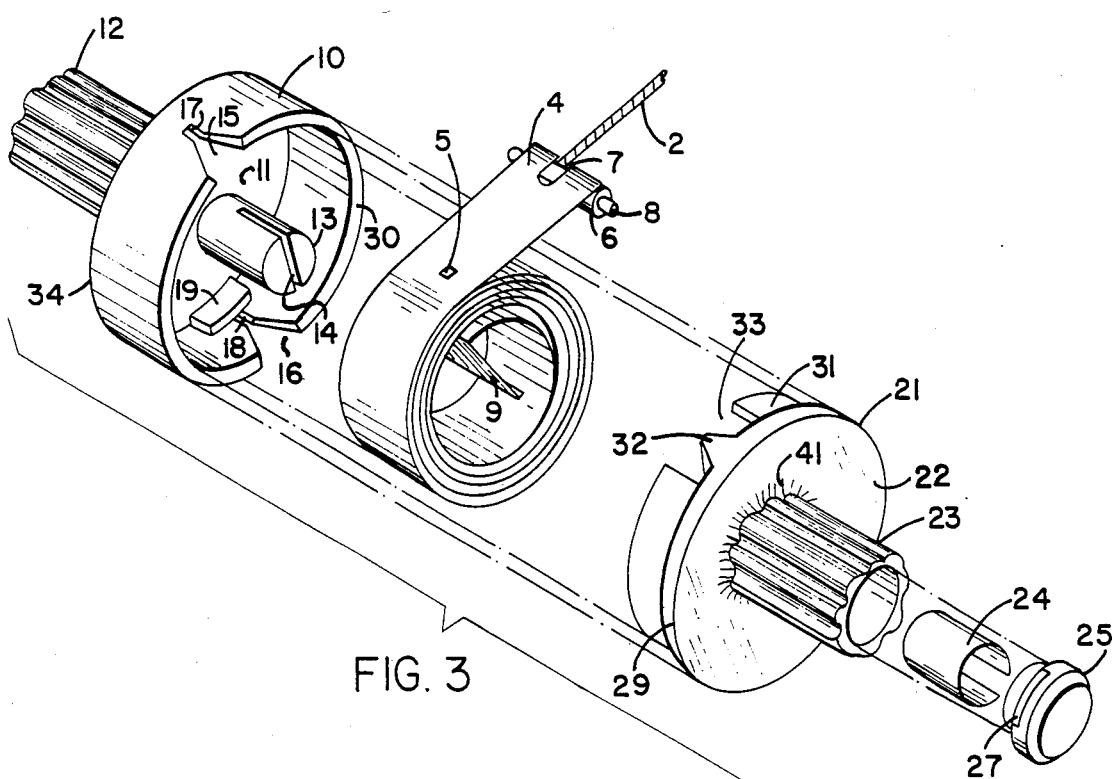
FIG. 3 is an exploded perspective view of the invention.

The least of the present invention comprises a handle assembly 1 as illustrated in FIGS. 1-6 and a high strength cable 2. The cable 2 is attached to any convenient means 3 for attaching the cable to an animal collar or to a skateboard or surfboard. This can be a ring or a carriage bolt, a snap clip or any other type of attachment device, and usually one that will swivel to provide freedom of movement.

The handle assembly comprises a coiled leaf spring 4 with its outermost coil fixedly attached to the next coil below with a rivet 5 in such a manner that the outermost coil of the leaf spring forms a cylinder. This cylinder provides a base for the spring to roll onto when retracting. The cylinder formed at this end of the spring may be done by riveting 5 as shown or by notching or spot welding. The object is to connect the first and second wrap of the spring in order to provide this base.

Spring 4 is attached to the cable 2 by providing a loop 6 at the end of the spring 4 and a slot 7 in the center of the end of the spring. The end of the cable 2 is fixedly attached to a bar 8 which can then be slid into the loop 6 of the spring and pulled tightly to fixedly attach into the loop 6.

The innermost end of the spring 9 is bent at a right angle with respect to the leaf coil.

The handle assembly comprises a hollow cylindrical element 10 having an end wall 1, an outer handle 12 extending from wall 11 outwardly and an inner slotted cylinder shaft 13 extending inwardly from the end wall 11. The slot 14 in the slotted cylinder shaft 13 is adapted to receive the right angle bend 9 of the spring 4, thereby providing a rotational restraint to the innermost end 9 of the leaf spring 4.

V shaped slots 15 and 16 are cut 180 degrees apart in the cylindrical element 10 to provide for ease of assembly of the handle as will be explained. The V shaped slots 15 and 16 terminate in rectangular holes 17 and 18, one of which will provide the passage for the cable 2 and the other one of which will provide a drain hole in case any water gets into the interior of the handle 1.

Interior blocks 19 and 20 abut the inner wall 11 of the cylindrical element 10 and abut the end of the rectangular holes 17 and 18 to provide structural strength when the two parts of the handle are put together. Block 20 adjacent the inner wall 11 and the rectangular hole 17 cannot be seen in FIG. 3 but is shown in FIG. 6.

The handle assembly further comprises a second hollow cylindrical element 21 whose outside diameter is equal to that of the outside diameter of the first hollow cylindrical element 10. Hollow cylindrical element 21 has an end wall 22 and a hollow cylindrical handle extension 23 which can, if desired, be made of transparent plastic. Both cylindrical extension elements 12 and 23 are hollow and may be used for the insertion of an identification tag 24 or any other information that the user determines to place into the hollow cylinders 12 or 23. Plugs 25 and 26, having slots 27 and 28, frictionally fit into the open end of handles 23 and 12. These plugs can be removed by a finger nail in slots 27 or 28 or the plugs 27 and 28 can be made to screw into or otherwise affix into the end of handles 23 and 12.

The surfaces of extension handles 23 and 12 are splined to give better finger grips on both sides of the handle.

Hollow cylindrical element 21 has an outer diameter rim 29 which fits against the inside edge 30 of cylindrical element 10. Cylindrical element 21 has an inside diameter rim 31 whose outer diameter is essentially equivalent to the inner diameter of cylindrical element 10.

Cylindrical element 21 also has a pointed protrusion 32 with a similar pointed protrusion 180 degrees on the opposite side of the rim 29, which is adapted to fit into the V shaped slots 15 and 16 of element 10. A cut out 33 with a similar cut out 180 degrees opposite is adapted to receive the rectangular fittings 19 and 20.

In this manner the two portions of the handle of the invention can be manufactured and put together by inserting the spring end 9 into the slot 14 and then pushing the two portions of the handle 10 and 21 together with the V shaped protrusions 32 and the one 180 degrees opposite of 32 fitting into the V shaped cut outs 15 and 16. In addition, since the two portions of the cylindrical elements 10 and 21 are identical in 180 degree phase, the handles can be put together in either direction and will fit properly. When the two portions of the handle 10 and 21 are pressed together, they are then sonically welded (since the product is normally made of plastic) along the rim created by the edge 29 and the edge 30 of the two portions. The device is also sonically welded along the outside edge 34 of cylindrical element 10 in order to give extreme structural strength to the entire unit. The unit ends up as one piece of hermetically sealed plastic with great strength.

Other methods of fastening the two portions of the device together are by an adhesive or any other convenient method. The spring 4 and cable 2 can be made of stainless steel to be rust proof. A self-lubricating plastic can be used to allow further ease of cable movement.

When the two portions 10 and 21 and fitted together, there remains 180 degrees apart open rectangular slots 17 and 18. Through one of these passes the cable 2 and the other one at the opposite end remains a hole for drainage of water should the handle be submerged in water.

Referring specifically now to FIG. 4, there is shown a cutaway view of the device of the present invention showing the plug 26 at the end of the handle 12 and showing how the two portions of the device are fitted together.

The dotted lines adjacent the hole 17 also show that there is an internal space created by the shape of the parts, in particular, the slanted blocks 19 and 20, which alllows tangential tracking of the cable 2 to help guide the cable 2 and prevent catching or snagging.

FIG. 5 is a blown up section of the inner portion of cylindrical element 10 showing the block 19 and the V shaped slots 16 and the rectangular hole 18. The edges 35 of the rectangular holes 18 are radiused or curved so that the cable 2 passing through that hole does not catch on any edge and will extend and retract more easily. The forward surface 36 of block 19 is also radiused or curved, again so that the cable 2 may extend and retract more easily across its surface. In addition, the side surfaces 37 and 38 of block 19 and similar block 20 are slanted so that the cable may pass more easily by these surfaces. All of this tends to provide a set of surfaces which is ideal for the cable to extend and retract without difficulty.

A radius or curvature 39, 40, 41 and 42 at the neck of the handles 12 and 23 with the cylindrical elements 10 and 21 gives added strength to the unit.

The means for attaching the cable 2 to a pet collar can be any convenient method such as a split ring or an eye hook, any of which will have a swivel connection to the cable so that the link is free to rotate with respect to the cable, giving more freedom to the use of the leash.

In use, the pet owner attaches the cable to a ring on the animal's collar. He grasps the handle assembly and as the animal trys to pull away, the cable is unwound from the outer cylinder portion of the leaf spring, the inner portion of the leaf spring being coiled up tightly until the end of the cable comes up to the opening in the handle assembly. At this point, the animal's freedom of movement is restrained. Should the animal owner release the handle assembly, the leaf spring will pull the cable back into the central portion of the handle assembly. The handle asembly is fixedly attached to the animal's collar. Therefore, it always remains with him.

In use with a skateboard or surfboard, the cable is fixedly attached to the front edge of the board and the handle assembly retracts and sits at the front of the board. In the event the user wishes to grab the cable in order to have hand control, he simply reaches down and grabs the handle and extends the cable and if he is at a point where he no longer wishes it, he can release it and it will retract and sit at the front edge of the board.

While various changes may be made in the detail construction, it is understood that such changes will be within the spirit and scope of the present invention. This is defined by the appended claims.

I claim:

1. A leash comprising a wire cable, means for fastening said cable to the device on which it is to be used, a hollow handle assembly having a coiled leaf spring therein, said leaf spring having its outermost coil restrained to form a hollow cylinder and its innermost end attached to a cylindrical shaft of the handle assembly, said leaf spring being attached at its outer end to the wire cable and tending to roll up the wire cable onto its outer cylindrical surface from the spring action of its inner coils wherein the spring is attached to the cable by providing a loop at the end of the spring adapted to receive a bar to which the cable is fixedly attached.

2. The leash of claim 1 further comprising a pair of hollow handle extensions for storing information.

3. The leash of claim 1 wherein the means of attachment of the cable to the device on which it is to be used is a swivel joint thereby providing freedom to rotate about the axis of the cable attached thereon.

4. The leash of claim 1 in which the handle assembly is comprised of two hollow cylindrical elements having end walls and outer handle extensions.

5. The device of claim 4 in which a pair of V shaped slots are cut 180 degrees apart in one hollow cylindrical element and a pair of pointed protrusions are provided in the opposite hollow cylindrical element adapated so that the pointed protrusions and the V shaped slots are adapted to fit together.

6. The device of claim 5 in which interior slanted blocks are provided which abut the inner wall of the cylindrical elements to provide added structral strength.

7. The device of claim 5 in which the V shaped slots terminate in a rectangular holes, one of which is adapted for passage of the cable and the other of which is adapted as a drain hole.

8. The device of claim 6 in which the interior blocks have slanted and radiused surfaces to provide for ease of passage of the cable.

9. The device of claim 7 in which the rectangular holes have radiused edges to provide for ease of passage of the cable.

10. The device of claim 4 in which the extension handles are splined for better gripping surfaces.

11. The device of claim 4 in which the two cylindrical portions are sonically welded together after assembly.

12. The device of claim 4 in which a radius is provided at the neck of the connection between the extension handles and the cylindrical elements to give added strength.

13. A leash comprising a wire cable, means for fastening said cable to the device on which it is to be used, a hollow handle assembly comprising a pair of oppositely opposed hollow cylindrical elements having end walls and outer handle extensions, said handle assembly also comprising a central cylindrical slotted shaft, a coiled leaf spring adapted to be held inside of the hollow handle assembly, said leaf spring having its outermost coil restrained to form a hollow cylinder and its innermost end attached to the central cylindrical slotted shaft, said leaf spring being attached at its outer end to the wire cable and tending to roll up the wire cable onto its outer cylindrical surface from the spring action of its inner coils wherein the spring is attached to the cable by providing a loop at the end of the spring adapted to receive a bar to which the cable is fixedly attached.

14. The device of claim 13 in which a plurality of V shaped slots are cut 180 degrees apart in one hollow cylindrical element and a plurality of pointed protrusions are provided in the opposite hollow cylindrical element, adapted so that the pointed protrusions and the V shaped slots are adapted to fit together.

15. The device of claim 14 in which interior blocks are provided which abut the inner wall of the cylindrical elements to provide added structural strength.

16. The device of claim 14 in which the V shaped slots terminate in rectangular holes, one of which is adapted for passage of the cable and the other of which is adapted as a drain hole.

17. The device of claim 15 in which the interior blocks have slanted and radiused surfaces to provide for ease of passage of the cable.

18. The device of claim 16 in which the rectangular holes have radiused edges to provide for ease of passage of the cable.

19. The device of claim 13 in which the extension handles are splined for better gripping surfaces.

20. The device of claim 13 in which the two cylindrical portions are sonically welded together after assembly.

21. The device of claim 13 in which a radius is provided at the neck of the connection between the extension handles and the cylindrical elements to give added strength.

* * * * *